Figure 1:
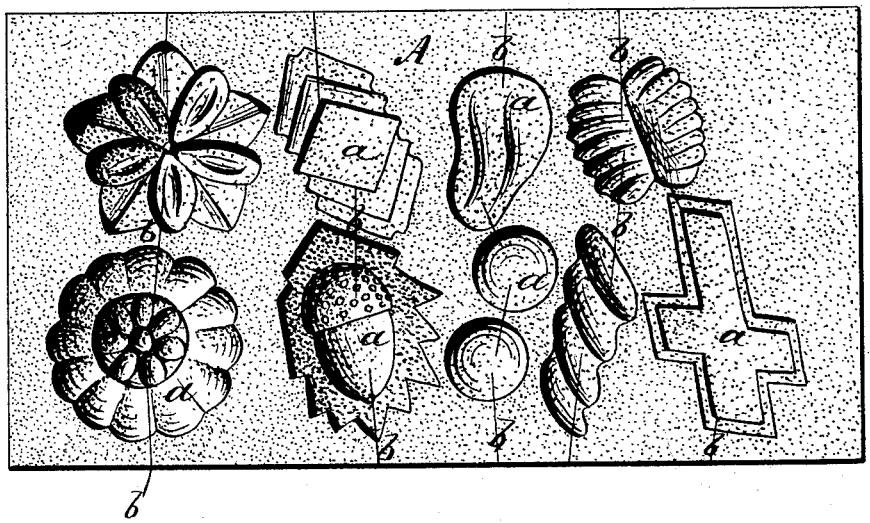

(No Model.)

W. E. COLEMAN.
MOLD TO BE USED IN THE MANUFACTURE OF CANDY.

No. 371,176. Patented Oct. 11, 1887.

Witnesses:
Wm. Gardner.
Thos. A. Pollock.

Inventor:
Walter E. Coleman
By his Attorney
Geo. H. Mintz

N. PETERS, Photo-Lithographer, Washington, D. C.

UNITED STATES PATENT OFFICE.

WALTER E. COLEMAN, OF BROOKLYN, ASSIGNOR TO THE COLEMAN PATENT CANDY MOULD MANUFACTURING COMPANY, OF NEW YORK, N. Y.

MOLD TO BE USED IN THE MANUFACTURE OF CANDY.

SPECIFICATION forming part of Letters Patent No. 371,176, dated October 11, 1887.

Application filed January 17, 1887. Serial No. 224,568. (No model.)

*To all whom it may concern:*

Be it known that I, WALTER E. COLEMAN, formerly a subject of the Queen of Great Britain, having declared my intention of becoming a citizen of the United States, and being at present a resident of the city of Brooklyn, in the county of Kings and State of New York, have invented certain new and useful Improvements in Molds to be Used in the Process of Manufacturing Confectionery; and I do hereby declare that the following is a full, clear, and exact description of the invention, sufficient to enable others skilled in the art to which it appertains to make and use the same.

My invention relates to the molds used in the process of manufacturing soft "molded goods" or confections, described in my application for patent filed April 28, 1886, which process consists, essentially, in depositing the prepared confectionery in matrices formed in an elastic or flexible mold, allowing the castings to set or harden, and then loosening or discharging them from the matrices by bending the mold, the elasticity of the latter facilitating the removal of the castings.

My invention consists, broadly, in a permanently-formed flexible mold for the manufacture of what are known to the trade as "soft" or "molded" goods, the mold being provided with suitably-shaped matrices in such manner that the inherent elasticity of the whole or a portion of the mold will permit of its being bent in order to open or expand the matrices and facilitate the loosening or discharge of the castings after they have set or hardened.

Previous to my invention goods of this class were made by pouring the confection by hand into temporary molds or matrices especially formed for each occasion in a bed of starch—that is to say, after leveling the surface of a quantity of starch deposited in a suitable "starch board" or tray, a series of intaglio impressions or matrices were formed by forcing alto-relievo patterns by hand into the starch. The confection material to be cast was then poured into the several matrices by hand, and after it had set or hardened sufficiently the whole contents of the starch board or tray were sifted to separate the castings from the body of starch, that still adhering to the castings being presumably removed by further subjecting the castings to an air-blast. For various reasons the old method is slow and expensive. Owing to the nature of the material in which the matrices are formed unusual care and skill must be bestowed upon the operation, in order to even approximate uniformity or perfection in result. Uniformity in the size and shape of the castings is desirable in all this class of goods, but especially when the castings are to be coated with chocolate or other comparatively expensive material, in which case imperfections or overflow not only spoil the appearance of the product, but also take up a disproportionately large quantity of the more expensive material. Again, the matrices, although so difficult and expensive to produce, are only available each for the formation of a single casting, so that, taking into consideration the number of matrices that are formed in the starch and not used on account of obvious imperfections, and also the number of castings that are finally discarded in practice for a similar reason, it will be seen that there are numerous disadvantages attending the use of such starch-molds.

A second feature of my invention consists in cutting or splitting the side walls of the matrices transversely, in order to facilitate the discharge of the castings, especially the discharge of the smaller round-shaped castings, which would otherwise be apt to be retarded, owing to the fact that such matrices are enlarged during the bending of the mold in one direction only, necessitating the shaking of the mold in order to dislodge them, and in some special patterns even creating sufficient lateral pressure to compress the castings and impair their symmetry. By thus splitting the side walls of the molds transversely all possible danger of lateral pressure or injury to even the most intricate and delicate castings is avoided. It is obvious that the back or bottom portion of the mold is necessarily flexible or elastic, and this is such an essential feature of my improved mold that when the side walls of the matrices are split transversely, as just described, the flexibility of the back or bottom portion of the mold may be relied upon entirely to effect the loosening or discharge of the castings by bending the mold, as before set forth.

My invention therefore includes the third feature of a mold having a flexible or elastic bottom or back provided with suitably-shaped matrices, the side walls of which are split transversely, which side walls may be either elastic or comparatively hard or rigid. Thus the front of the mold may be vulcanized or otherwise treated until the side walls of the matrices are rendered comparatively hard, or absolutely-rigid side walls might be used upon a suitable elastic or flexible bottom or back, without deviation from the essential feature of my invention, which consists, primarily, in a permanent mold for the manufacture of soft candies, which is capable of being bent in order to loosen or discharge the castings.

Figure 2:
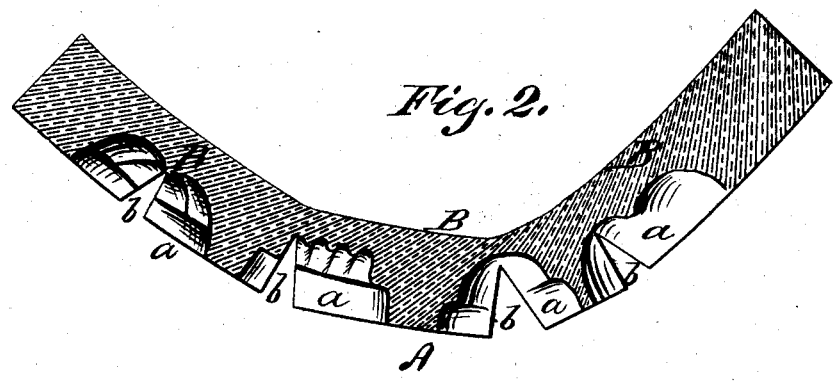

In the accompanying drawings, Figure 1 is a top view of my improved mold, consisting of a sheet or plaque of suitable material or materials formed with a series of matrices of various shapes suitable for the manufacture of fancy soft candies. Fig. 2 is a longitudinal section of the same inverted and bent so as to open the matrices.

The body of the mold A is preferably formed of comparatively soft elastic caoutchouc, or of a combination of that and other substances; or any other suitable elastic or flexible material may be used. The matrices $a\,a$ are formed in any suitable or well-known manner, and after the rubber or other material has been vulcanized or otherwise treated to give it the necessary consistency and firmness the side walls of the matrices are preferably, though not necessarily, cut or slit transversely to a suitable depth, as indicated by the lines $b$ in Fig. 1 and by the inverted-V-shaped spaces in Fig. 2.

It is obvious that when the side walls of the matrices are split, as described, the bottom or back B only of the mold need be made elastic or flexible, although even under these conditions a certain amount of resilience or elasticity is desirable in the side walls of the matrices in order to insure a perfect fit or union of the parts when closed.

The mold is used in substantially the same manner as set forth in my application hereinbefore referred to, the prepared material, in a liquid or soft condition, being deposited in the matrices and the surplus removed by suitable means, the castings allowed to set or harden, and then being loosened by bending the mold, thereby opening the matrices sufficiently to permit of the removal or discharge of the castings. When inverted and bent, as shown in Fig. 2, it will be seen that all of the castings will have ample clearance and must necessarily be discharged, the slitting of the side walls of the respective matrices preventing their contracting the matrices laterally when the mold is bent longitudinally and causing all portions of their side walls to recede from the castings without pressure upon the latter.

If preferred, the flexible or elastic bottom or back B may be applied to the matrices in the form of a separate sheet or backing formed independently and secured to the material constituting the side walls of the matrices in any appropriate manner.

What I claim as my invention, and desire to secure by Letters Patent, is—

1. A permanent flexible mold for the manufacture of confectionery, formed with suitably-shaped matrices, for the purpose and substantially in the manner described.

2. A permanent flexible mold for the manufacture of confectionery, formed with matrices the side walls of which are split transversely, for the purpose and substantially in the manner described.

3. A permanent mold for the manufacture of confectionery, formed with matrices of suitable shape, the side walls of which are split transversely and with a flexible bottom or backing, for the purpose and substantially in the manner described.

WALTER E. COLEMAN.

Witnesses.
WM. GARDNER,
GEO. W. MIATT.